(12) United States Patent
Shi

(10) Patent No.: US 11,650,058 B2
(45) Date of Patent: May 16, 2023

(54) POSE ESTIMATION FOR MOBILE AUTONOMOUS APPARATUS AT FRACTIONAL TIME PERIODS OF A COMPLETE SENSOR SWEEP

(71) Applicant: Intel Corporation, Santa Clara, CA (US)

(72) Inventor: Xuesong Shi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 16/633,976

(22) PCT Filed: Aug. 28, 2017

(86) PCT No.: PCT/CN2017/099231
§ 371 (c)(1),
(2) Date: Jan. 24, 2020

(87) PCT Pub. No.: WO2019/041081
PCT Pub. Date: Mar. 7, 2019

(65) Prior Publication Data
US 2020/0217962 A1    Jul. 9, 2020

(51) Int. Cl.
*G01S 17/00* (2020.01)
*G01C 21/20* (2006.01)
(Continued)

(52) U.S. Cl.
CPC ............ *G01C 21/20* (2013.01); *G01S 7/4808* (2013.01); *G01S 17/42* (2013.01); *G01S 17/89* (2013.01)

(58) Field of Classification Search
None
See application file for complete search history.

(56) References Cited

U.S. PATENT DOCUMENTS 8,831,290 B2    9/2014  Ramalingam et al.
9,950,685 B1 *  4/2018  Deyaf .................... B60R 21/12
(Continued)

FOREIGN PATENT DOCUMENTS

CN           106500699 A        3/2017

OTHER PUBLICATIONS

International Search Report and Written Opinion dated May 23, 2018 for International Patent Application No. PPCT/CN2017/099231, 9 pages.

*Primary Examiner* — Jonathan M Dager
(74) *Attorney, Agent, or Firm* — Schwabe, Williamson & Wyatt, P.C.

(57) ABSTRACT

Apparatus for determining a current pose of a mobile autonomous apparatus is presented. In embodiments, an apparatus may include interface circuitry to receive detection and ranging data outputted by a Light Detection and Ranging (LIDAR) sensor that nominally sweeps and provides D degrees of detection and ranging data in continuous plurality of quanta, each covering a portion of the D degrees sweep, every time period T. The apparatus may further include pose estimation circuitry coupled to the interface circuitry to determine and provide a current pose of the mobile autonomous apparatus every fractional time period t, independent of when the LIDAR sensor actually completes each sweep. In embodiments, the apparatus may be disposed on the mobile autonomous apparatus.

25 Claims, 7 Drawing Sheets

(51) Int. Cl.
 *G01S 7/48* (2006.01)
 *G01S 17/42* (2006.01)
 *G01S 17/89* (2020.01)

(56) References Cited

U.S. PATENT DOCUMENTS

| | | |
|---|---|---|
| 2009/0161915 A1 | 6/2009 | Chen et al. |
| 2016/0209846 A1 | 7/2016 | Eustice et al. |
| 2019/0204850 A1* | 7/2019 | Panzica ............... G05D 1/0274 |
| 2019/0318177 A1* | 10/2019 | Steinberg ............. G01S 7/4815 |
| 2020/0064483 A1* | 2/2020 | Li ........................ G01S 7/4026 |
| 2020/0218288 A1* | 7/2020 | Johnson ............... G05D 1/0022 |
| 2021/0208283 A1* | 7/2021 | Zhao .................... H04N 5/2329 |

\* cited by examiner

T Pose
                                                     250
                                  ← 200            t Pose
                                                    260
                                                  Precision
                                                     270

211  [   |   |   |   ]

210 — T₀  212  [T₀ |   |   |   ]

213  [T₀ |T₀ |   |   ]

214  [T₀ |T₀ |T₀ |   ]

221  [T₀ |T₀ |T₀ |T₀ ]  P₀   $\hat{P}_{11}$  =

220 — T₁  222  [T₁ |T₀ |T₀ |T₀ ]  P₀   $\hat{P}_{12}$  >

223  [T₁ |T₁ |T₀ |T₀ ]  P₀   $\hat{P}_{13}$  >

224  [T₁ |T₁ |T₁ |T₀ ]  P₀   $\hat{P}_{14}$  >

231  [T₁ |T₁ |T₁ |T₁ ]  P₁   $\hat{P}_{21}$  ~

230 — T₂  232  [T₂ |T₁ |T₁ |T₁ ]  P₁   $\hat{P}_{22}$  >

233  [T₂ |T₂ |T₁ |T₁ ]  P₁   $\hat{P}_{23}$  >

234  [T₂ |T₂ |T₂ |T₁ ]  P₁   $\hat{P}_{24}$  >

FIG. 2

POSE ESTIMATION FOR MOBILE AUTONOMOUS APPARATUS AT FRACTIONAL TIME PERIODS OF A COMPLETE SENSOR SWEEP

CROSS REFERENCE TO RELATED APPLICATIONS

The present application is a national phase entry under 35 U.S.C. § 371 of International Application No. PCT/CN2017/099231, filed Aug. 28, 2017, entitled "POSE ESTIMATION FOR MOBILE AUTONOMOUS APPARATUS AT FRACTIONAL TIME PERIODS OF A COMPLETE SENSOR SWEEP", which designated, among the various States, the United States of America. The Specifications of the PCT/CN2017/099231 Application is hereby incorporated by reference.

TECHNICAL FIELD

Various embodiments generally may relate to the field of mobile autonomous apparatus, and in particular to pose estimation for such apparatus at fractional time periods of a complete sensor sweep.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile autonomous apparatuses, such as robots, self-driving cars or unmanned aerial vehicles (UAVs) need to determine their current poses (location and orientation) in real time. This procedure, usually referred to as localization, is generally performed by a pose estimation algorithm operating on ranging data obtained by sensors.

In most designs poses are estimated from sensor data obtained via a Light Detection and Ranging (LIDAR) sensor, camera, and/or other kinds of sensors. For LIDAR-based designs, there is generally a laser scanner in a LIDAR device that rotates at a certain frequency (typically 5-40 Hz) to get a full, or nearly full, view of the environment. Generally, an apparatus updates the pose estimate each time it receives a new set of scan data. As a result, the pose estimation frequency is restricted by the rotation rate of the laser scanner. When a higher frequency of pose estimation is required, a higher-end LIDAR device must be chosen, which generally increases cost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates contents of an example moving buffer for holding sensor data and FIG. 3 illustrates a comparison of fractional pose estimation determination with and without LIDAR driver support according to various embodiments.

DETAILED DESCRIPTION

Figure 1:
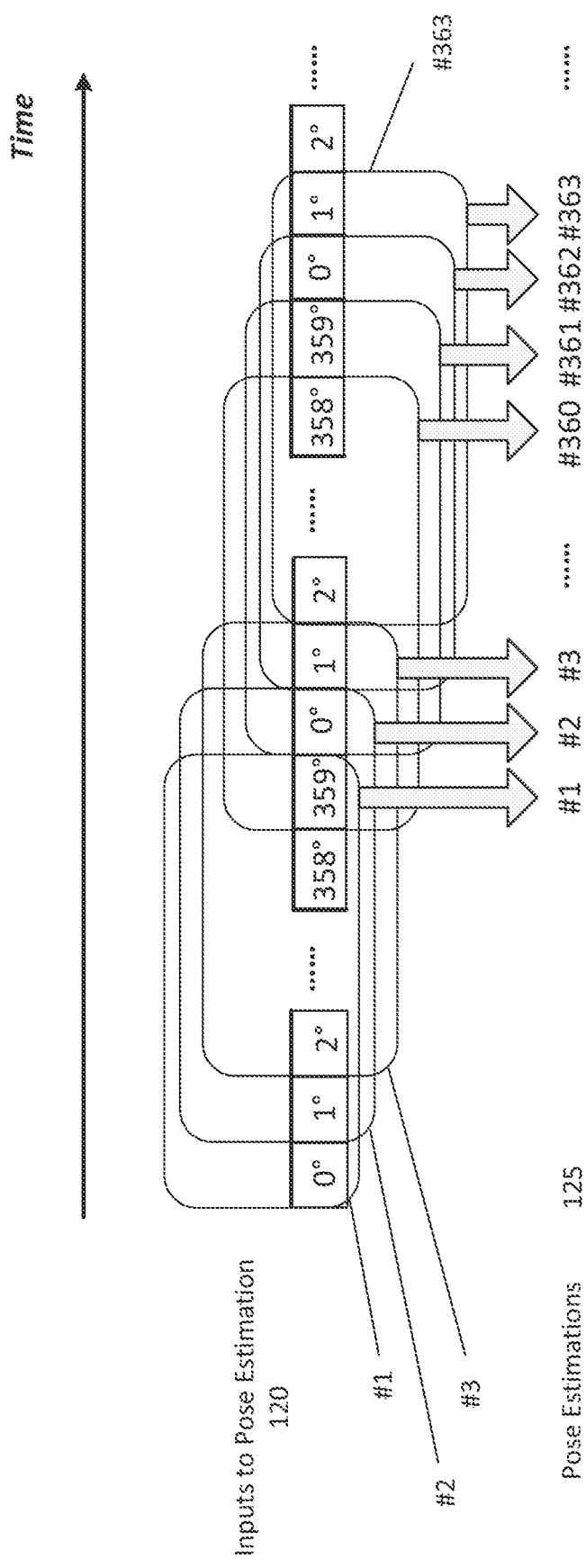
FIG. 1 illustrates an example of pose estimation inputs and pose estimation cycles using segments of LIDAR sensor data that are fractions of a full cycle of data according to various embodiments of the present disclosure.

In embodiments, an apparatus for determining a current pose of a mobile autonomous apparatus may be provided. The apparatus may include interface circuitry to receive detection and ranging data output by a Light Detection and Ranging (LIDAR) sensor that nominally sweeps and provides D degrees of detection and ranging data in continuous plurality of quanta, each covering a portion of the D degrees sweep, every time period T. The apparatus may further include pose estimation circuitry coupled to the interface circuitry to determine and provide a current pose of the mobile autonomous apparatus every fractional time period t, independent of when the LIDAR sensor actually completes each sweep. In embodiments, the apparatus may be disposed on the mobile autonomous apparatus.

In embodiments, the pose determining apparatus may significantly increase the frequency at which a mobile autonomous apparatus is able to perform pose estimation.

In embodiments, the mobile autonomous apparatus may be a robot, a self-driving or computer assisted driving vehicle, an unmanned aerial vehicle (UAV) or "drone", or the like.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group, including one or more "processing elements (PEs) of a data flow machine), and/or memory (shared, dedicated, or group) that execute one or more software or firmware programs, a programmable combinational logic circuit (e.g. Field Programmable Gate Arrays (FPGA)), and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As noted, in general, a LIDAR device will send data from its laser scanner to a host processor via some type of serial communication protocol in real time while the scanner is rotating. It then sends a synchronizing signal to the host processor when the scanner rotates through a predefined angle, e.g., 360°. The host processor then knows that a cycle of scan has finished and it may perform pose estimation using the scanned data from that cycle. In embodiments, a host processor need not wait for the synchronizing signal to determine an estimated pose. In fact, in embodiments, the host processor may perform pose estimation each time it receives a programmable segment of scanned data, representing a fraction of a full scan. For example, for the standard 360° scan cycle, in embodiments pose estimation may occur after each segment of 90° worth of scan data has been received, thus increasing the frequency of pose estimations by a factor of four. In embodiments, to ensure that the estimator still has a full view of the environment, as in conventional solutions, the host processor may keep the scan data for a segment for several estimations and regroup the stored data with newly received segments.

In embodiments, system costs may be reduced. For some use cases frequent pose estimates are desirable. For example, if it is desired to move a robot quickly, say, at a 2 m/s speed (which is a brisk walking speed of a human), then pose estimation at 5-10 Hz, which is the typical rotation rate of low-end LIDARs, may likely be too slow for obstacle avoidance and motor control, as the robot would move ahead up to 20-40 cm per scan cycle. To provide pose estimations to keep up with the speed of the robot, either a high-end LIDAR needs to be chosen, with, for example, a rotation rate of 40 Hz, or various embodiments implemented to obtain a high frequency of pose estimation with a lower-end LIDAR device.

Additionally, in embodiments, the robustness of pose estimation may be enhanced. Most pose estimation schemes are iterative, meaning that the algorithm takes the pose estimate of a last cycle as an initial value of pose estimation of a current cycle. The algorithm may fail if the ground-truth pose of the current cycle is too far away from that initial value. Because, in embodiments, the cycle of pose estimation may be greatly shortened, this may result in fewer differences between successive poses of adjacent cycles, and can therefore reduce the possibility of pose estimation failures.

FIG. 1 illustrates an example LIDAR device that acquires scan data every angular degree, as implemented according to various embodiments. As noted above, in embodiments pose estimation may be invoked each time a small amount of scan data has been obtained, as opposed to waiting for a whole cycle of scan data as in conventional solutions. FIG. 1 shows how the scan data may be regrouped to ensure that the pose estimation algorithm always has a full view.

With reference to FIG. 1, as may be seen, the inputs to pose estimation 120 include 360 degrees of scan data. Moreover in the example of FIG. 1, the inputs to pose estimation 120 are provided to a pose estimation algorithm in a host processor (not shown) every second, for a total of 360 pose estimations 125 per cycle, an increase in pose estimation frequency by a factor of 360. This is accomplished by each of the inputs to pose estimation 120 using a new 1 degree worth of scan data (essentially one scan data point) in combination with the immediately prior 359 degrees worth of scan data. Thus, for example, input to pose estimation #3 uses data points 2° through 359° of the immediately prior scan, and data points at 0° and 1° of the currently ongoing scan, where the latter is the newly acquired scan datapoint. In embodiments, the process of FIG. 1 is facilitated by maintaining a moving buffer to store a full 360° of scan data on a rolling basis, as next described in connection with FIG. 2.

It is noted that in the example of FIG. 1 it is assumed that the laser scanner senses 360 times per cycle from 0° to 359°. It is noted that this is an illustrative example, and in practice, the range and interval of angles may be different. Thus, for example, a scanner may scan every 0.25° from 0° to 270°, or may even be non-fixed. In embodiments, numerous variations in angular interval and range may be used. For example, the inventors successfully implemented an embodiment using a RPLidar A2 LIDAR device, which scans 400 times per 360° cycle with non-uniform angular intervals.

It is further here noted that in FIG. 1 pose estimation is shown as being invoked for every single scan data point. This is also an illustrative example, and not required. In fact, in some cases it may be impractical due to limitations of computational resources, or for other reasons. Thus, for example, in embodiments implemented on the RPLidar A2 device, pose estimation was invoked each time a segment of 32 new scan data points were obtained (out of a total 400 scans per cycle). Thus, in that example implementation, the rate of pose estimation was increased by a factor of 12.5 (400/32) instead of by 400.

FIG. 2 illustrates a buffer 200 according to various embodiments. With reference to FIG. 2 there is shown the contents of buffer 200 during three successive scan cycles: T0 210, T1 220 and T3 230. In this example, buffer 200 obtains scan data in ¼ fractions of a scan cycle, or, for a sensor which takes a time period T to complete a full scan, the buffer obtains increments of data every fractional time period t, where t is T/4. Thus, using the 360 scans per cycle of FIG. 1 as an example, each segment includes 90 degrees worth of scan data.

As a result, the buffer obtains new data segments four times during a scan cycle, and thus always maintains four segments of data: the new segment and the immediately prior three segments. Thus, four segments of data are input to a pose estimation algorithm, which may be run in a processor, or in a hardware accelerator, such as an FPGA, as described more fully below.

Continuing with reference to FIG. 2, to the right of the illustration of the buffer contents over time, there are three columns, T pose 250 and t pose 260, which each refer to pose estimations, and precision 270 which expresses whether the t pose estimation 260 is more precise, or equal in precision, to the T pose estimation. T pose 250 provides the pose estimation resulting from only calculating pose once every scan cycle, whereas t pose 260 provides the pose estimation, according to various embodiments, where pose is estimated after each fractional segment of scan data is obtained.

Continuing with reference to FIG. 2, at 210 the buffer contents are shown for a first scan cycle, T0. Each row illustrates the contents of moving buffer 200 at the beginning of its time period. It is noted that each successive row in the buffer illustrates the contents at the next t interval, and thus the temporal distance between any two successive rows in buffer 200 is the fractional time t. Because t=T/4, there are four configurations of the buffer shown for each scan cycle. Initially, at 211, where t=0, there is no data stored in moving buffer 200. At 212, which is time t=1, the first segment enters for scan T0, as shown at the far left of the row. At rows 213 and 214, at times t=2 and t=3, respectively, the second and third data segments enter the buffer, such that at 214, the last configuration for scan T0, there are three data segments stored. It is noted that because a data segment is not available until some time just after it has been acquired, it is only during the first segment of scan T1, which represents the buffer contents at the beginning of the scan cycle T1, that all the data from scan T0 is available.

Thus, at time t=4, at the beginning of scan cycle T1, as shown in row 221, all four segments of scan data are now available for calculating an estimated pose. Here T Pose 250 shows P0, a first full scan cycle pose, and t pose shows P11, the first pose according to embodiments hereof, based on fractional data segments. It is noted that for ease of illustration the t pose values have a "hat" over the "P." Because P0 and P11 use the same data, they are equal in precision, as indicated by the "=" sign in the Precision 270 column. Thus, pose P0 is the same as fractional pose P11, as they use the identical set of input data.

Continuing with reference to FIG. 2, at rows 222 through 224, the next three fractional segments of scan T1 data enter moving buffer 200, such that at row 224, at the beginning of the last fractional time interval of scan cycle T1, moving buffer 200 has three segments of T1 data and the final segment of scan T0's data. Additionally, at each of rows 222-224, while the T Pose 250 does not change, the t Pose does. Thus at each of rows 222, 223 and 224, a t Pose P12, P13 and P14 are calculated, based on a mix of T0 and T1 data segments, as shown. Because these t Poses each use newer data than T Pose 260 P0, each of them has a higher precision than P0, as shown in Precision column 270, where each oft Poses P12, P13 and P14 are shown as having a greater precision than P0, indicated by the ">" symbol.

Thus, at time t=8, at the beginning of scan cycle T2, as shown in row 231, all four segments of T1 scan data are now available for calculating an estimated pose. Here T Pose 250 shows P1, a second full scan cycle pose, and t pose shows P21, the first pose to use all of the T1 scan data. As above, because P1 and P21 use the same data, they are approximately equal in precision, as indicated by the "~" sign in the Precision 270 column. However, it is noted, they are not exactly equal, because the output of a pose estimation also depends on the output of previous cycle, which is why, in embodiments, robustness of pose estimation may be enhanced. Thus pose P21 is more accurate than pose P1, even though they are based on the same data, as pose P21 is also based on prior pose P14, whereas P1 is based only on prior pose P0.

Continuing further with reference to FIG. 2, at rows 232 through 234, representing times t=9 through t=11, the next three fractional segments of scan T2 data enter moving buffer 200, such that at row 234, at the beginning of the last fractional time interval of scan cycle T2, the buffer has three segments of T2 data and the final segment of scan T1 data. As above, at each of rows 232-234, while the T Pose 250 does not change, the t Pose does. Thus, at each of rows 232, 233 and 234, a t Pose P22, P23 and P24 are calculated, based on a mix of T1 and T2 data segments, as shown. Because these t Poses each use newer data than T Pose 260 P1, each of them has a higher precision than P1, as shown in Precision column 270, where each oft Poses P22, P23 and P24 are shown as having a greater precision than P0, indicated by the ">" symbol.

As may be understood, there is a relationship between scanning rate and number of fractional data segments to store in moving buffer 200. Assuming that a LIDAR device spins at R revolutions per second, and scans S times per second, it would generate S/R scan data in each scan cycle. Assuming further that a quantity P of data is encapsulated together for transmission between the LIDAR device and a host, then, in embodiments, ⌊S/R/P⌋ segments may be kept in the buffer.

The embodiment illustrated in FIG. 2, as noted, obtains fractional data during several intervals during each scan cycle. As such, a host processor executing a pose estimation algorithm operates independently of the scan cycle synchronization signal that a LIDAR sensor may output, and may calculate pose estimation according to its own defined segments of data at intervals of fractional time t. It is noted that this is possible in embodiments where a driver of the LIDAR device may be accessed, and the LIDAR device thereby instructed to provide fractional data segments to a host processor. Sometimes it may not be possible to change the data output parameters of a LIDAR device. However, in alternate embodiments, it is also possible to accelerate pose estimation frequency, even without access to the LIDAR device's driver, as next described with reference to FIG. 3.

Figure 3:
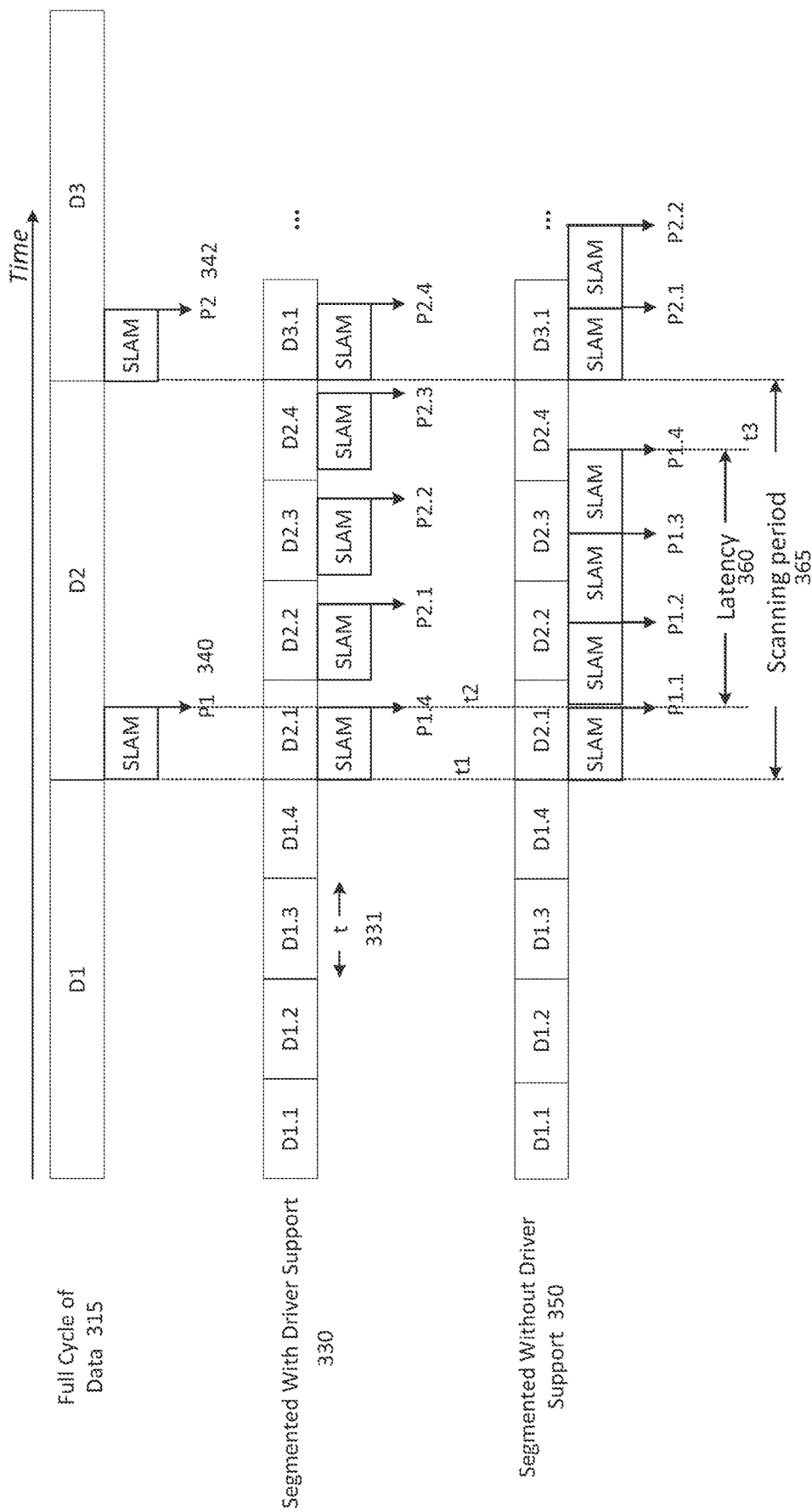

FIG. 3 illustrates a comparison of the timing of scan data provided by a LIDAR device in three scenarios, and the corresponding timing of pose estimation based on that data. The three scenarios include Full Cycle 315, which is a standard LIDAR full cycle of data pose estimation, as discussed above, Segmented With Driver Support 330, and Segmented Without Driver Support 350. The information for Full Cycle 315 is presented for comparison purposes and ease of illustration of the timing of both scan data delivery and pose estimation in the two illustrated embodiments 330 and 350.

With reference to FIG. 3, in Full Cycle 315, a full scan of data must be collected before a pose estimation may occur. In FIG. 3 the term "SLAM" is used for pose estimation, referring to "Simultaneous Localization and Mapping algorithm." Thus, P1 340, the pose estimation for scan cycle D1, occurs a slight time into scan cycle D2, as shown. Similarly, P2 342, the pose estimation for scan cycle D2, occurs a slight time into scan cycle D32, also as shown. This latency is a feature of the finite time it takes to perform a SLAM calculation following receipt of the data that is input to the calculation, and is essentially the same in each of scenarios 315, 330 and 350.

Continuing further with reference to FIG. 3, the second scenario, Segmented With Driver Support, is that illustrated in FIGS. 1 and 2. As expected, there are four SLAM calculations per scan cycle. For example, as shown during scan cycle D2, P1.4, P2.1, P2.2, and P2.3. SLAM P1.4 operates on the four fractional data segments acquired during scan cycle D1, namely D1.1, D1.2, D1.3, and D1.4, which are analogous to the four fractional data segments for scan cycle T0, shown in row 221 of FIG. 2. P1.4 is followed at a fractional time t by SLAM P2.1, which operates on the mixed set of D1 and D2 data, namely D1.2, D1.3, D1.4 and D2.1, as described above. As may be seen in FIG. 3, each SLAM calculation finishes at some time following the last segment of its data being obtained. Thus, in scenario 330, P1.4 is finished some time t2 after the end of data segment D1.4 at t1, and SLAM P2.1 is finished some time after the end of data segment D2.1, etc. In this example the latency of a SLAM calculation (t241) is less than the time interval t 331, of one fractional time period. Moreover, P1.4 is comparable with P1, but as noted, not the same because the output of SLAM also depends on the output of a previous cycle, which is why, as noted, various embodiments may enhance robustness.

Turning now to scenario 350 of FIG. 3, the "Segmented Without Driver Support" scenario, although in this scenario a host processor receives a whole cycle of scan data each time, by buffering and delaying the calculations, it may be pretended within the host processor that the scan data comes sequentially, and thus in fractional segments, and FastScan may be performed on those segments to optimize scan data processing. It is noted that embodiments hereof may be referred to as "FastScan" for convenience. Moreover, in embodiments of scenario 350, the segmentation may be specified essentially at will, limited only by computation power and capacity of the host computer in performing the SLAM calculations.

Continuing with reference to FIG. 3, as shown in scenario 350, FastScan calculations P1.1, P1.2, P1.3 and P1.4 all occur sequentially during data cycle D2, because FastScan has to wait to receive all of the D1 data before it can process the various segments it divides the D1 data into. This, as shown, introduces an additional latency 360 over and above scenario 330, which outputs an estimated pose P1.4 a slight time t2 after scan cycle D1 ends at t1, as shown, whereas in scenario 350 pose P1.4 is output at time t3, where (t3−t2) =latency 360. In embodiments, additional latency 360 may be strictly less than the period 365 of one scanning cycle, which would be acceptable in most applications.

Figure 4:
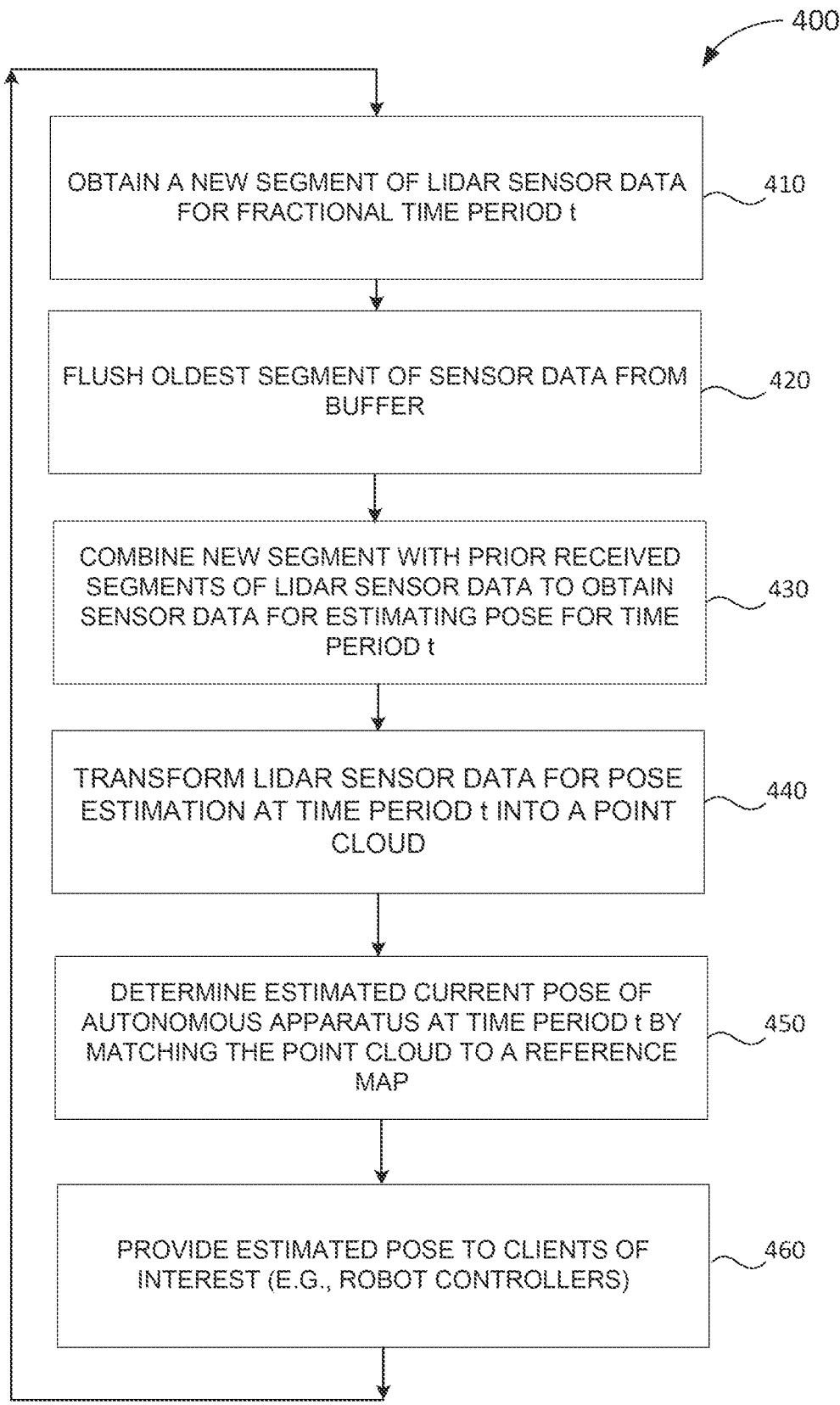
FIG. 4 illustrates an overview of the operational flow of a process for determination of an estimated pose of an autonomous apparatus using fractions of a full cycle of data in real time, in accordance with various embodiments.
Figure 5:
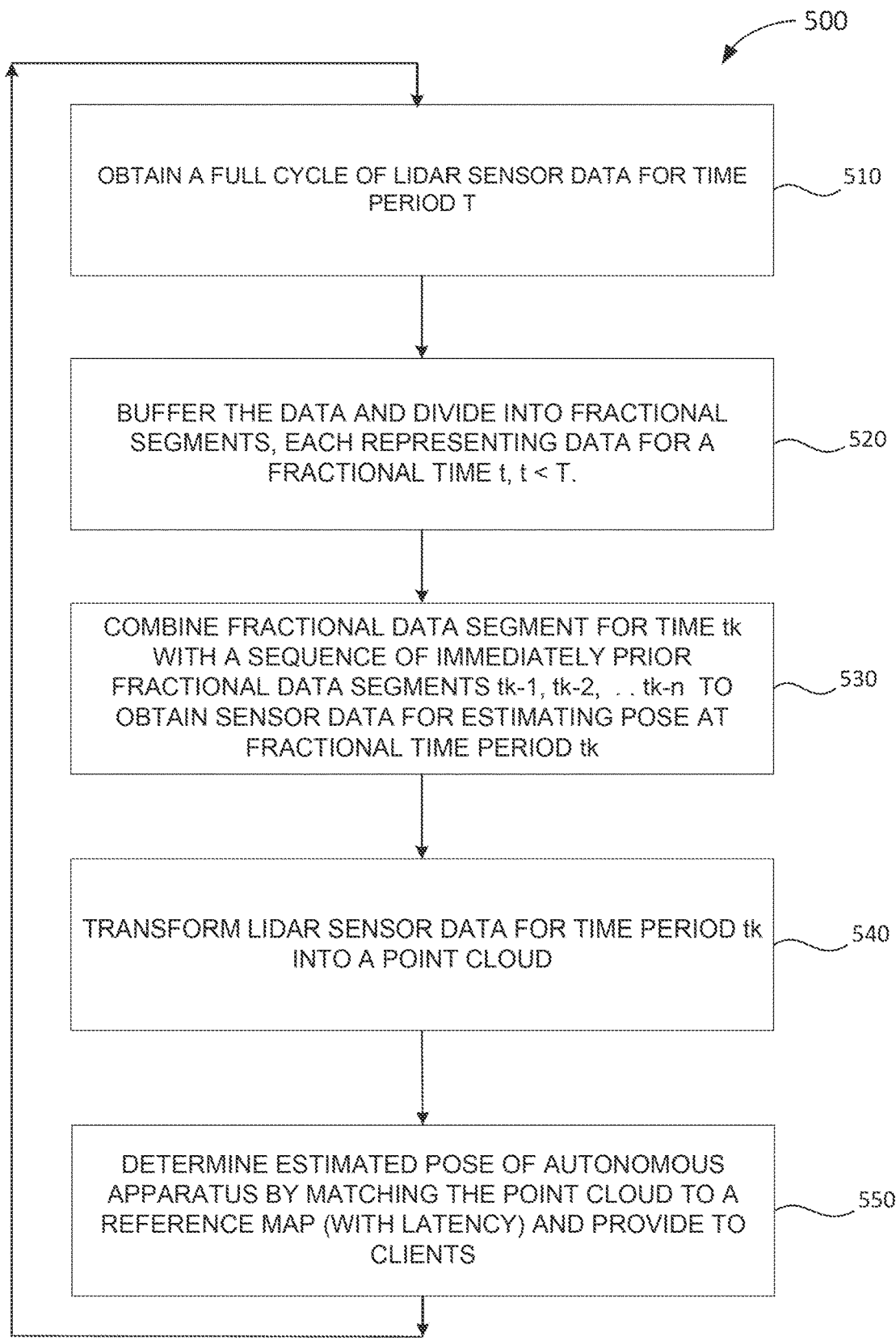
FIG. 5 illustrates an overview of the operational flow of a process for determination of an estimated pose of an autonomous apparatus using fractions of a full cycle of data, with latency, in accordance with various embodiments.

FIGS. 4 and 5, next described, illustrate overview of the operational flow of a process for pose estimation of an autonomous apparatus according to embodiments of scenario 330, and scenario 350, respectively. Such an autonomous apparatus may be a robot, self-driving or computer assisted driving vehicle, an unmanned aerial vehicle (UAV) or "drone", or the like. These figures are next described.

Figure 6:
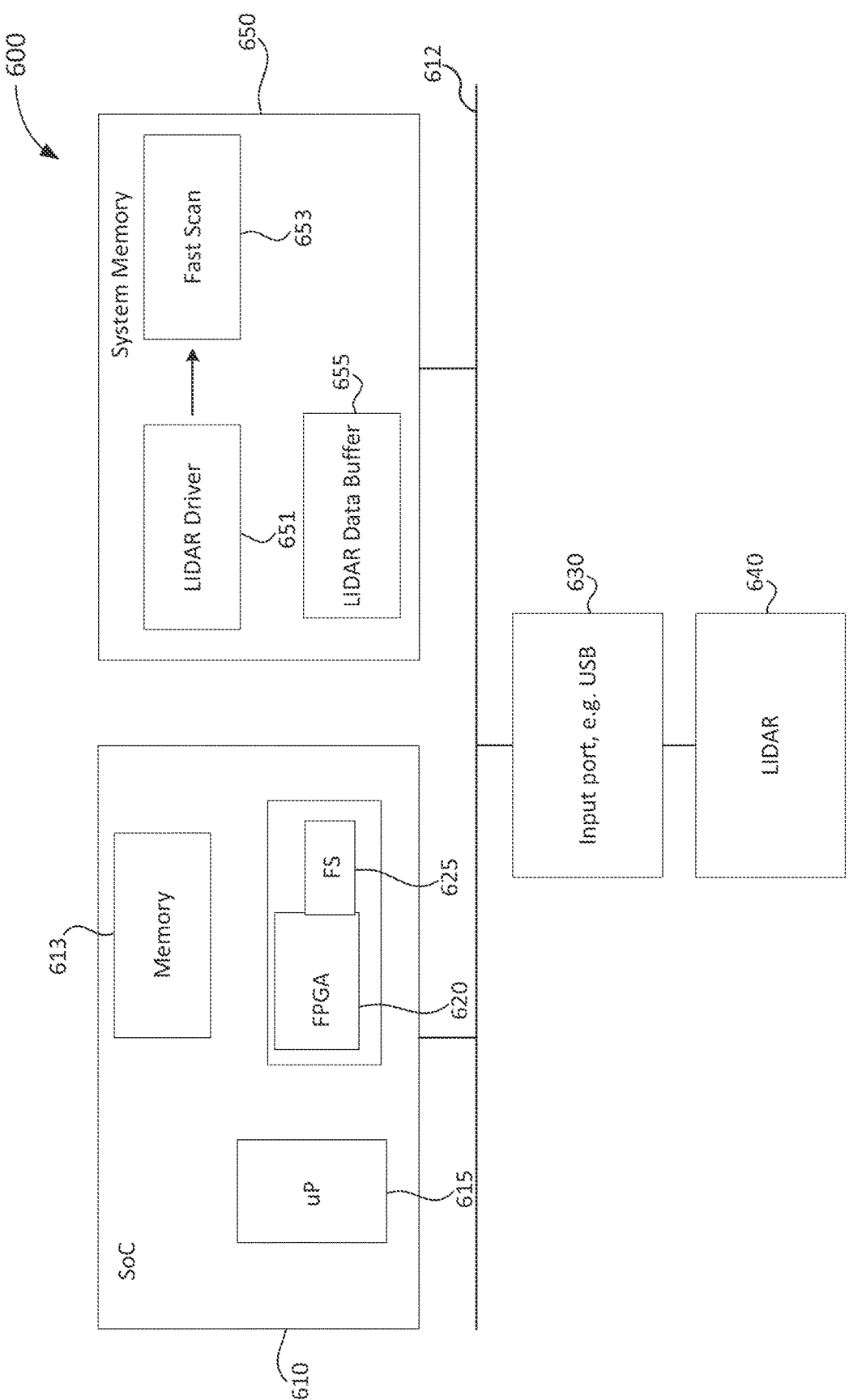
FIG. 6 illustrates a block diagram of a computer device suitable for practicing the present disclosure, in accordance with various embodiments.

FIG. 4 illustrates an overview of the operational flow of a process for pose determination of an autonomous apparatus using fractions of a full cycle of data, in accordance with various embodiments. The process of FIG. 4 may be performed by a computer device 600 as depicted in FIG. 6. As illustrated, process 400 may include operations performed at blocks 410-460. Process 400 may begin at block 410. At block 410 a new segment of LIDAR sensor data for fractional time period t may be obtained. From block 410 process 400 may proceed to block 420, where an oldest fractional segment of sensor data may be flushed from a buffer, e.g., LIDAR Data Buffer 655 provided in computer device 600 of FIG. 6, described below, or buffer 200 illustrated in FIG. 2, and described above.

Continuing with reference to FIG. 4, from block 420 process 400 may proceed to block 430, where the new segment of data may be combined with prior received segments of LIDAR sensor data for estimating pose for (fractional) time period t. From block 430 process 400 may proceed to block 440, where the LIDAR sensor data for the pose estimation at time period t (which, as noted, includes the latest received segment and sufficient earlier received segments to comprise a time T worth of sensor data) may be transformed into a point cloud. From block 440 process 400 may proceed to block 450, where an estimated current pose of autonomous apparatus at (fractional) time period t by matching the point cloud to a reference map. From block 450 process 400 may proceed to block 460, where the estimated current pose of the autonomous apparatus at time period t may be provided to various clients, such as motion controllers, etc. At block 460, process 400 may return to block 410, and receive the next fractional segment of data, of if there is none, process 400 may terminate.

FIG. 5 illustrates an overview of the operational flow of a process for pose estimation for autonomous apparatus using fractions of a full cycle of data, in accordance with embodiments where the host processor receives a full scan cycle of data at a time, such as in scenario 350 of FIG. 3 described above. The process of FIG. 5 may be performed by a computer device 600 as depicted in FIG. 6. As illustrated, process 500 may include operations performed at blocks 510-550. Process 500 may begin at block 510. At block 410 a full scan cycle of LIDAR sensor data for a scan period T may be obtained. From block 510 process 500 may proceed to block 520, where the data may be buffered and divided into fractional segments, each representing data for a fractional time t, t<t.

Continuing with reference to FIG. 5, from block 520 process 500 may proceed to block 530, where the fractional segment of data for time tk may be combined with a sequence of immediately prior fractional data segments tk−1, tk−2, . . . tk−n to obtain sensor data for estimating pose at fractional time period tk. From block 530 process 500 may proceed to block 540, where the LIDAR sensor data for the pose estimation at time period tk (which, as noted, includes the latest received segment for time tk, and sufficient earlier received segments tk−1, tk−2, . . . tk−n to comprise a time T worth of sensor data) may be transformed into a point cloud.

From block 540 process 500 may proceed to block 550, where an estimated current pose of the autonomous apparatus at time period tk may be determined by matching the point cloud to a reference map, and the estimated pose provided to various clients, such as motion controllers, etc. This determination of estimated pose has some latency relative to the end of time period tk, as noted above in connection with FIG. 3, scenario 350. From block 550 process 500 may return to block 510, and receive the next full cycle of data, of if there is none, process 500 may terminate.

FIG. 6 illustrates a block diagram of a computer device suitable for practicing the present disclosure, in accordance with various embodiments. Prior to describing FIG. 6 in detail, some detail of an example SLAM calculation, performed by an example SLAM program, according to various embodiments is first provided. The example calculation is a specific implementation of process 400 of FIG. 4, described above. In embodiments, there may be seven tasks performed in a pose estimation. (The division into tasks is arbitrary, and is for illustrative purposes only). First, a LIDAR device may scan an environment of an autonomous device, and send the data to a host computer. In embodiments, this data represents a fractional segment of a full scan cycle. The fraction of a full scan cycle encompassed by the segment may be chosen, as well as modified, by an embodiment. Second, a LIDAR driver on the host computer may pre-process the data and publish it to a SLAM program. Third, the SLAM program may regroup the scan data with a moving buffer, and also decide how much previously received data to flush from the buffer, in order to always maintain a full cycle of scan data. Fourth, the SLAM program may receive scan data (angles+ranges) and transform them into a point cloud, which includes coordinates of all of the scanned points from the perspective of the autonomous apparatus. Fifth, the SLAM program may try to find a pose at which the point cloud best matches a map. Sixth, in an optional task, the SLAM program may update the map with the point cloud and the estimated pose (this task may be skipped if a pre-constructed map exists). Finally, and seventh, the SLAM program may publish the estimated pose and the updated map to any clients of interest.

Among all of the tasks just described, the fifth (scan matching) may be the most compute-intensive. Thus, in embodiments, it may be performed by an FPGA, while the other tasks (except the first one) may be performed by software running on a CPU, for example an ARM CPU provided in a System on Chip (SoC). In such embodiments, each time the software obtains a cycle of data including a new segment of scan data, it may transform the data into a point cloud and copy the point cloud to an FPGA via shared memory. The process may then, for example, invoke scan matching logic in the FPGA by writing a signal onto a pre-defined address of the shared memory. In such embodiments, the FPGA may perform scan matching, write back the estimated pose, and notify the software program. In some embodiments a map may be pre-constructed and static (not updated after each, or any, pose estimation). In such embodiments the map may be copied to the FPGA only when the process begins.

Thus, the host processor may include interface circuitry to receive detection and ranging data outputted by a Light Detection and Ranging (LIDAR) sensor that nominally sweeps and provides D degrees of detection and ranging data in continuous plurality of quanta, each covering a portion of the D degrees sweep, every time period T.

The host processor apparatus may further include pose estimation circuitry coupled to the interface circuitry to determine and provide a current pose of the mobile autonomous apparatus every fractional time period t, independent of when the LIDAR sensor actually completes each sweep.

In embodiments, the host processor and the LIDAR sensor device may be disposed on the mobile autonomous apparatus.

It is here noted that in this example implementation, the more an embodiment increases the scan frequency (i.e., decreases the number of data points per segment), the more work the FPGA has to do, and the fifth task (find a pose at which the point cloud best matches a map) thus repeats multiple times per scan cycle.

Given the description of these tasks, referring now to FIG. 6, a block diagram of a computer device suitable for practicing the present disclosure, in accordance with various embodiments, is illustrated. As shown, computer device 600 may include a SoC 610 and a System Memory 650. SoC 610 may include one or more processors 615, memory 613 and a hardware accelerator, such as FPGA 620. FPGA 620 may be provided with a FastScan core, including scan matching logic to perform pose estimations, according to various embodiments.

System Memory 650 may include any known volatile or non-volatile memory, and may include a LIDAR driver 651. System Memory 650 may also be provided with a FastScan module 653 which manages the various tasks described above, except the intensive computation implemented in FPGA 620. System Memory 650 may also include LIDAR Data Buffer 655, which may act as the buffer described in connection with FIG. 2, as described above. It should be noted, in alternate embodiments, the entire Fast Scan computation may be implemented in hardware or software, as opposed the illustrated hybrid embodiment.

Additionally, computer device 600 may include Input Port 630, e.g., a Universal Serial Bus (USB) port, which may be communicably connected to LIDAR device 640 to receive the sensor data to be buffered and operated upon to perform pose estimations, as described above. In alternate embodiments, other serial or parallel port may be used instead. The elements of computer device 600 may be coupled to each other via system bus 612, which may represent one or more buses. In the case of multiple buses, they may be bridged by one or more bus bridges (not shown).

Each of these elements may perform its conventional functions known in the art. In particular, system memory 650 may be employed to store a working copy and a permanent copy of the executable code of the programming instructions of LIDAR driver 651 and Fast Scan 653 which may be configured to practice a FastScan application which may include (aspects of) processes 400 and 500 of FIGS. 4 and 5, respectively. In embodiments, system memory 650 may also include programming instructions implementing an operating system, and one or more other applications. The programming instructions may comprise assembler instructions supported by processor(s) 615 or high-level languages, such as, for example, C, that can be compiled into such instructions.

The executable code of the programming instructions or the bit streams for configuring hardware accelerator 620 may be placed into system memory 650 and/or SoC memory 613 in the factory, or in the field, through, for example, a distribution medium (not shown), such as a compact disc (CD), USB storage device, or the like, or through input port 630 (from a distribution server (not shown)). The number, capability and/or capacity of these elements may vary, depending on the intended use of example computer device 600, i.e., what kind of mobile autonomous device example computer device 600 is embedded in. The constitutions of these elements are otherwise known, and accordingly will not be further described.

Figure 7:
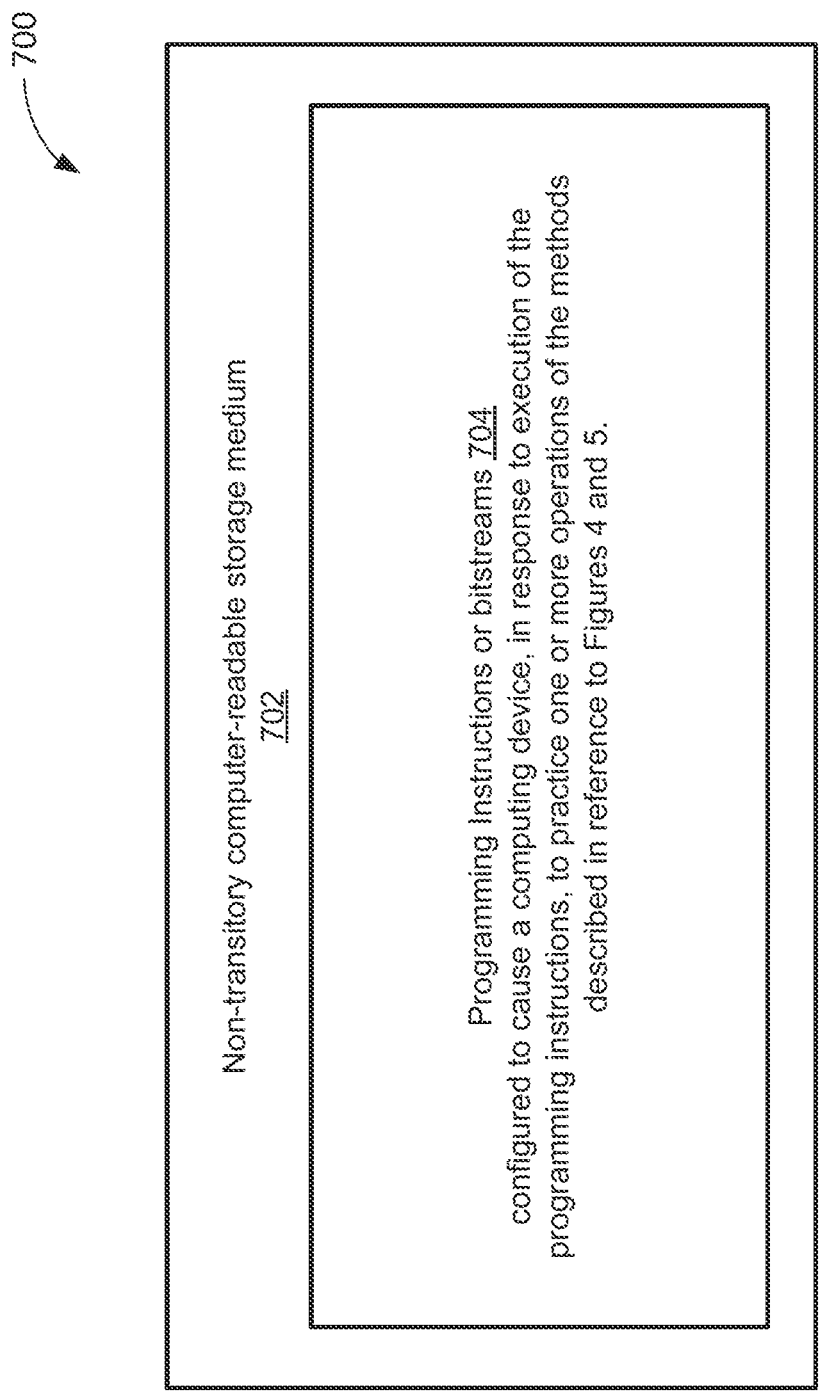
FIG. 7 illustrates an example computer-readable storage medium having instructions configured to practice aspects of the processes shown in FIGS. 4 and 5, in accordance with various embodiments.

FIG. 7 illustrates an example computer-readable storage medium having instructions configured to implement and/or practice (aspects of) processes 400 and 500 of FIGS. 4 and 5, respectively, earlier described, in accordance with various embodiments. As illustrated, computer-readable storage medium 702 may include the executable code of a number of programming instructions or bit streams 704. Executable code of programming instructions (or bit streams) 704 may be configured to enable a device, e.g., computer device 600, in response to execution of the executable code/programming instructions (or operation of FPGA 620), to perform (aspects of) processes 400 and 500 of FIGS. 4 and 5, respectively. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

It is noted that a FastScan embodiment as disclosed has been implemented in a robot platform with RPLidar A2 (a low-end LIDAR product from Slamtec). It increased the frequency of pose estimation by 12.5× (from 10 Hz to 125 Hz), which enhanced the robustness of pose estimation. It is also noted that a robot, or other autonomous device, is more likely to get lost (e.g., failing to track its pose with a SLAM algorithm) while rotating, rather than while moving forward. To address this problem, a maximum angular velocity at which a robot could spin around without getting lost, with two different robot platforms in several different scenarios, has been tested. It has been found that using FastScan, the robots could spin about two times faster.

It is further noted that in alternate embodiments, a standard computer, e.g., a desktop or an Intel® Next Unit of Computing (NUC), without a FPGA, may be used to implement FastScan embodiments. A FastScan embodiment as disclosed has also been implemented in a robot platform with RPLidar A2 using a desktop with an Intel® Core i7 CPU. In that example implementation the frequency of pose estimation cycle was increased by 7×, to approximately 70 Hz, as opposed to 125 Hz with a FPGA, due to a more limited computing capacity.

In embodiments, the programming instructions implementing the Fast Scan of the present disclosure may be included in the device driver/SDK from LIDAR manufacturers.

Illustrative examples of the technologies disclosed herein are provided below. An embodiment of the technologies may include any one or more, and any combination of, the examples described below.

EXAMPLES

Example 1 may include an apparatus for determining a current pose of a mobile autonomous apparatus, comprising: interface circuitry to receive detection and ranging data outputted by a Light Detection and Ranging (LIDAR) sensor that nominally sweeps and provides D degrees of detection and ranging data in continuous plurality of quanta, each covering a portion of the D degrees sweep, every time period T; and pose estimation circuitry coupled to the interface circuitry to determine and provide a current pose of the mobile autonomous apparatus every fractional time period t, independent of when the LIDAR sensor actually completes each sweep. The apparatus may be disposed on the mobile autonomous apparatus.

Example 2 may include the apparatus of example 1, and/or other examples herein, wherein each data quantum covers d degrees, and wherein D is divisible by d.

Example 3 may include the apparatus of example 1, and/or other examples herein, wherein D is equal to 360 degrees.

Example 4 may include the apparatus of example 1, and/or other examples herein, wherein T is divisible by t.

Example 5 may include the apparatus of example 3, and/or other examples herein, wherein d is 90 degrees, and t is ¼ of T.

Example 6 may include the apparatus of example 1, and/or other examples herein, wherein d is 1 degree, and t is $\frac{1}{360}^{th}$ of T.

Example 7 may include the apparatus of example 1, and/or other examples herein, further comprising a buffer to hold detection and ranging data of at least one sweep.

Example 8 may include the apparatus of any one of examples 1-7, and/or other examples herein, wherein the pose estimation circuitry is to access the buffer for detection and ranging data of one sweep every time period t.

Example 9 may include the apparatus of example 7, and/or other examples herein, further comprising a driver to access the buffer and provide detection and ranging data of one sweep to the pose estimation circuitry every time period t.

Example 10 may include the apparatus of example 9, and/or other examples herein, wherein the LIDAR sensor issues a synchronization signal to indicate when it actually completes a sweep, and wherein the driver provides the detection and ranging data of one sweep to the pose estimation circuitry every time period t, independent of the synchronization signal.

Example 11 may include the apparatus of example 1, and/or other examples herein, wherein to determine and provide a current pose, the pose estimation circuitry transforms the detection and ranging data into a point cloud, and determines the current pose by matching the point cloud against a reference map.

Example 12 may include the apparatus of example 11, and/or other examples herein, wherein the pose estimation circuitry comprises a processor and a detection and ranging data transformation program operated by the processor to transform the detection and ranging data into a point cloud.

Example 13 may include the apparatus of example 12, and/or other examples herein, wherein the pose estimation circuitry comprises a hardware accelerator to determine the current pose by matching the point cloud against a reference map.

Example 14 may include the apparatus of example 13, and/or other examples herein 14, wherein the hardware accelerator comprises a FPGA.

Example 15 may include the apparatus of any one of examples 1-6, and/or other examples herein, wherein the mobile autonomous apparatus is a robot.

Example 16 may include the apparatus of any one of examples 1-6, and/or other examples herein, wherein the mobile autonomous apparatus is an autonomous self-driving automobile.

Example 17 may include the apparatus of any one of examples 1-6, and/or other examples herein, wherein the mobile autonomous apparatus is an unmanned aerial vehicle (UAV).

Example 18 may include a method to be performed by a computer device on a mobile autonomous apparatus for determining a current pose of the mobile autonomous apparatus, comprising: receiving, by the computer device, detection and ranging data outputted by a Light Detection and Ranging (LIDAR) sensor that nominally sweeps and provides D degrees of detection and ranging data in continuous plurality of quanta, each covering a portion of the D degrees sweep, every time period T; and determining and providing, by the computer device, a current pose of the mobile autonomous apparatus every fractional time period t, independent of when the LIDAR sensor actually completes each sweep.

Example 19 may include the method of example 18, and/or other examples herein, wherein each data quantum covers d degrees, wherein D is divisible by d, and wherein T is divisible by t.

Example 20 may include the method of example 18, and/or other examples herein, wherein D is equal to 360 degrees, and d is 90 degrees.

Example 21 may include the method of any one of examples 18-20, and/or other examples herein, further comprising storing, by the computer device, detection and ranging data of at least one sweep in a buffer.

Example 22 may include the method of example 21, and/or other examples herein, further comprising accessing, by the computer device, the buffer for detection and ranging data of one sweep every time period t.

Example 23 may include the method of example 18, and/or other examples herein, wherein the determining and providing a current pose includes transforming, by the computer device, the detection and ranging data into a point cloud, and determining the current pose by matching the point cloud against a reference map.

Example 24 may include the method of example 23, and/or other examples herein, wherein the computer device comprises a hardware accelerator, and wherein the determining the current pose includes matching, by the hardware accelerator, the point cloud against a reference map.

Example 25 may include the method of any one of examples 18-20, and/or other examples herein, wherein the mobile autonomous apparatus is a robot.

Example 26 may include the method of any one of examples 18-20, and/or other examples herein, wherein the mobile autonomous apparatus is an autonomous self-driving automobile.

Example 27 may include the method of any one of examples 18-20, and/or other examples herein, wherein the mobile autonomous apparatus is an unmanned aerial vehicle (UAV).

Example 28 may include the method of any one of examples 18-20, and/or other examples herein, wherein the LIDAR sensor issues a synchronization signal to indicate when it actually completes a sweep, and wherein the computer device determines and provides a current pose of the mobile autonomous apparatus every fractional time period t, independent of the synchronization signal.

Example 29 may include the method of example 24, and/or other examples herein, wherein the hardware accelerator comprises a FPGA.

Example 30 may include one or more non-transitory computer-readable storage media comprising a plurality of instructions that in response to being executed cause a computing device to: receive, by the computing device, detection and ranging data outputted by a Light Detection and Ranging (LIDAR) sensor that nominally sweeps and provides D degrees of detection and ranging data in continuous plurality of quanta, each covering a portion of the D degrees sweep, every time period T; and determine and provide, by the computing device, a current pose of the mobile autonomous apparatus every fractional time period t, independent of when the LIDAR sensor actually completes each sweep.

Example 31 may include the one or more non-transitory computer-readable storage media of example 30, and/or other examples herein, wherein each data quantum covers d degrees, wherein D is divisible by d, and wherein T is divisible by t.

Example 32 may include the one or more non-transitory computer-readable storage media of example 30, and/or other examples herein, wherein D is equal to 360 degrees, and d is 90 degrees.

Example 33 may include the one or more non-transitory computer-readable storage media of any one of examples 30-32, and/or other examples herein, further comprising storing, by the computing device, detection and ranging data of at least one sweep in a buffer.

Example 34 may include the one or more non-transitory computer-readable storage media of example 33, and/or other examples herein 34, further comprising accessing, by the computing device, the buffer for detection and ranging data of one sweep every time period t.

Example 35 may include the one or more non-transitory computer-readable storage media of example 30, and/or other examples herein 35, wherein the determine and provide a current pose includes transforming, by the computing device, the detection and ranging data into a point cloud, and determining the current pose by matching the point cloud against a reference map.

Example 36 may include the one or more non-transitory computer-readable storage media of example 35, and/or other examples herein, wherein the computing device comprises a hardware accelerator, and wherein the determining the current pose includes matching, by the hardware accelerator, the point cloud against a reference map.

Example 37 may include the one or more non-transitory computer-readable storage media of example 36, and/or other examples herein, wherein the hardware accelerator comprises a FPGA.

Example 38 may include the one or more non-transitory computer-readable storage media of any one of examples 30-32, and/or other examples herein, wherein the mobile autonomous apparatus is a robot.

Example 39 may include the one or more non-transitory computer-readable storage media of any one of examples 30-32, and/or other examples herein, wherein the mobile autonomous apparatus is an autonomous self-driving automobile.

Example 40 may include the one or more non-transitory computer-readable storage media of any one of examples 30-32, and/or other examples herein, wherein the mobile autonomous apparatus is an unmanned aerial vehicle (UAV).

Example 41 may include the one or more non-transitory computer-readable storage media of any one of claims 30-32, and/or other examples herein, wherein the LIDAR sensor issues a synchronization signal to indicate when it actually completes a sweep, and wherein the computing device determines and provides a current pose of the mobile autonomous apparatus every fractional time period t, independent of the synchronization signal.

Example 42 may include an apparatus for computing disposed in a mobile autonomous apparatus, comprising: means for receiving detection and ranging data outputted by a Light Detection and Ranging (LIDAR) sensor that nominally sweeps and provides D degrees of detection and ranging data in continuous plurality of quanta, each covering a portion of the D degrees sweep, every time period T; and means, coupled to the means for receiving, for determining and providing a current pose of the mobile autonomous apparatus every fractional time period t, independent of when the LIDAR sensor actually completes each sweep.

Example 43 may include the apparatus for computing of example 41, and/or other examples herein, wherein each data quantum covers d degrees, and wherein D is divisible by d.

Example 44 may include the apparatus for computing of example 42, and/or other examples herein, wherein D is equal to 360 degrees.

Example 45 may include the apparatus for computing of example 43, and/or other examples herein, wherein T is divisible by t.

Example 46 may include the apparatus for computing of example 44, and/or other examples herein, wherein d is 1 degree, and t is ¼ of T.

Example 47 may include the apparatus for computing of example 44, and/or other examples herein, wherein d is 1 degree, and t is $1/360^{th}$ of T.

Example 48 may include the apparatus for computing of any one of examples 42-48 and/or other examples herein, further comprising memory means for holding detection and ranging data of at least one sweep.

Example 49 may include the apparatus for computing of example 48, and/or other examples herein, wherein the means for determining and providing is to access the memory means for detection and ranging data of one sweep every time period t.

Example 50 may include the apparatus for computing of example 49, and/or other examples herein, further comprising means for accessing to access the memory means and provide detection and ranging data of one sweep to the means for determining and providing every time period t.

Example 51 may include the apparatus for computing of example 50, and/or other examples herein, wherein the LIDAR sensor issues a synchronization signal to indicate when it actually completes a sweep, and wherein the means for accessing provides the detection and ranging data of one sweep to the means for determining and providing every time period t, independent of the synchronization signal.

Example 52 may include the apparatus for computing of example 42, and/or other examples herein, wherein to determine and provide a current pose, the means for determining and providing transforms the detection and ranging data into a point cloud, and determines the current pose by matching the point cloud against a reference map.

Example 53 may include the apparatus for computing of example 42, and/or other examples herein, wherein the means for determining and providing comprises processing means and a detection and ranging data transformation program operated by the processing means to transform the detection and ranging data into a point cloud.

Example 54 may include the apparatus for computing of example 53, and/or other examples herein, wherein the means for determining and providing comprises hardware acceleration means to determine the current pose by matching the point cloud against a reference map.

Example 55 may include the apparatus for computing of example 54, and/or other examples herein, wherein the hardware acceleration means comprises a FPGA.

Example 56 may include the apparatus for computing of any one of examples 42-47, and/or other examples herein, wherein the mobile autonomous apparatus is a robot.

Example 57 may include the apparatus for computing of any one of examples 42-47, and/or other examples herein, wherein the mobile autonomous apparatus is an autonomous self-driving automobile.

Example 58 may include the apparatus for computing of any one of examples 42-47, and/or other examples herein, wherein the mobile autonomous apparatus is an unmanned aerial vehicle (UAV).

What is claimed is:

1. An apparatus for determining a current pose of a mobile autonomous apparatus, comprising:

interface circuitry to receive detection and ranging data outputted by a Light Detection and Ranging (LIDAR) sensor that nominally sweeps and provides D degrees of the detection and ranging data in a continuous plurality of data units, each data unit of the plurality of data units covering a portion of the D degrees sweep, every time period T; and pose estimation circuitry coupled to the interface circuitry to determine and provide the current pose of the mobile autonomous apparatus every fractional time period t, independent of when the LIDAR sensor actually completes each sweep, wherein the apparatus is disposed on the mobile autonomous apparatus.

2. The apparatus of claim 1, wherein each data unit covers d degrees, and wherein D is divisible by d.

3. The apparatus of claim 2, wherein D is equal to 360 degrees.

4. The apparatus of claim 1, wherein T is divisible by t.

5. The apparatus of claim 3, wherein d is 90 degrees, and t is ¼ of T.

6. The apparatus of claim 3, wherein d is 1 degree, and t is $1/360_{th}$ of T.

7. The apparatus of claim 1, further comprising a buffer to hold detection and ranging data of at least one sweep.

8. The apparatus of claim 7, wherein the pose estimation circuitry is to access the buffer for detection and ranging data of one sweep every time period t.

9. The apparatus of claim 8, further comprising a driver to access the buffer and provide the detection and ranging data of the one sweep to the pose estimation circuitry every time period t.

10. The apparatus of claim 9, wherein the LIDAR sensor issues a synchronization signal to indicate when it actually completes a sweep, and wherein the driver provides the detection and ranging data of the one sweep to the pose estimation circuitry every time period t, independent of the synchronization signal.

11. The apparatus of claim 1, wherein to determine and provide the current pose, the pose estimation circuitry transforms the detection and ranging data into a point cloud, and determines the current pose by matching the point cloud against a reference map.

12. The apparatus of claim 11, wherein the pose estimation circuitry comprises a processor and a detection and ranging data transformation program operated by the processor to transform the detection and ranging data into the point cloud.

13. The apparatus of claim 12, wherein the pose estimation circuitry comprises a hardware accelerator to determine the current pose by matching the point cloud against the reference map.

14. The apparatus of claim 13, wherein the hardware accelerator comprises a FPGA.

15. The apparatus of claim 1, wherein the mobile autonomous apparatus is a robot, an autonomous self-driving automobile, or an unmanned aerial vehicle (UAV).

16. A method to be performed by a computer device on a mobile autonomous apparatus for determining a current pose of the mobile autonomous apparatus, comprising:

receiving, by the computer device, detection and ranging data outputted by a Light Detection and Ranging (LIDAR) sensor that nominally sweeps and provides D degrees of the detection and ranging data continuously as a set of data units, each data unit of the set of data units covering a portion of the D degrees sweep, every time period T; and determining and providing, by the computer device, the current pose of the mobile autonomous apparatus every fractional time period t, independent of when the LIDAR sensor actually completes each sweep.

17. The method of claim 16, wherein each data unit covers d degrees, wherein D is divisible by d, and wherein T is divisible by t.

18. The method of claim 16, wherein D is equal to 360 degrees, and d is 90 degrees.

19. The method of claim 16, further comprising:

storing, by the computer device, detection and ranging data of at least one sweep in a buffer; and accessing, by the computer device, the buffer for detection and ranging data of one sweep every time period t.

20. The method of claim 19, wherein the determining and providing the current pose includes:

transforming, by the computer device, the detection and ranging data into a point cloud; and determining the current pose by matching the point cloud against a reference map.

21. The method of claim 20, wherein the computer device comprises a hardware accelerator, and wherein the determining the current pose includes:

matching, by the hardware accelerator, the point cloud against the reference map.

22. The method of claim 20, wherein the mobile autonomous apparatus is at least one of a robot, an autonomous self-driving automobile, or an unmanned aerial vehicle (UAV).

23. One or more non-transitory computer-readable media (NTCRM) comprising instructions for determining a current pose of a mobile autonomous apparatus, wherein execution of the instructions by one or more processors is to cause a computer device on the mobile autonomous apparatus to:

receive detection and ranging data outputted by a Light Detection and Ranging (LIDAR) sensor that nominally sweeps and provides D degrees of the detection and ranging data in continuous set of data units, each data unit of the set of data units covering a portion of the D degrees sweep, every time period T, and wherein each data unit covers d degrees and D is divisible by d; and determine the current pose of the mobile autonomous apparatus every fractional time period t, independent of when the LIDAR sensor actually completes each sweep.

24. The one or more NTCRM of claim 23, wherein the execution of the instructions is to cause the computer device to:

transform the detection and ranging data into a point cloud, and determine the current pose by matching the point cloud against a reference map.

25. The one or more NTCRM of claim 23, wherein the mobile autonomous apparatus is one or more of a robot, an autonomous or semi-autonomous driving vehicle, or an unmanned aerial vehicle (UAV).

* * * * *